(12) United States Patent
Dillard (10) Patent No.: US 10,979,582 B2
(45) Date of Patent: Apr. 13, 2021

(54) EXTENSION OF REMOTE FRAME BUFFER (RFB) PROTOCOL

(71) Applicant: KYOCERA Document Solutions, Inc., Osaka (JP)

(72) Inventor: Olga Dillard, Concord, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/510,782

(22) Filed: Jul. 12, 2019

(65) Prior Publication Data
US 2021/0014369 A1    Jan. 14, 2021

(51) Int. Cl.
| | | |
|---|---|---|
| H04N 1/00 | (2006.01) |
| H04L 29/08 | (2006.01) |
| G09G 5/38 | (2006.01) |
| G06F 3/0486 | (2013.01) |
| G06F 3/0484 | (2013.01) |
| G06F 3/0482 | (2013.01) |
| G06F 3/12 | (2006.01) |
| G06K 15/02 | (2006.01) |
| G06F 3/16 | (2006.01) |

(52) U.S. Cl.
CPC ....... *H04N 1/00411* (2013.01); *G06F 3/0482* (2013.01); *G06F 3/0486* (2013.01); *G06F 3/04847* (2013.01); *G06F 3/167* (2013.01); *G09G 5/38* (2013.01); *H04L 69/329* (2013.01); *H04N 1/00244* (2013.01)

(58) Field of Classification Search
None
See application file for complete search history.

(56) References Cited

U.S. PATENT DOCUMENTS

| | | | | |
|---|---|---|---|---|
| 2006/0290680 A1* | 12/2006 | Tanaka | ............... | H04N 1/32523 345/173 |
| 2010/0241653 A1* | 9/2010 | Sakiyama | ............... | G06F 16/33 707/769 |
| 2011/0157004 A1* | 6/2011 | Ohashi | ............... | H04N 21/4222 345/156 |
| 2012/0113468 A1* | 5/2012 | Urakawa | ................. | G06F 9/452 358/1.15 |
| 2012/0200571 A1* | 8/2012 | Newell | ............... | G06F 3/04883 345/428 |
| 2014/0258380 A1* | 9/2014 | Urakawa | ................. | H04L 67/42 709/203 |
| 2015/0169197 A1* | 6/2015 | Muto | .................... | G06F 3/0481 715/798 |
| 2016/0034253 A1* | 2/2016 | Bang | .................... | G06F 9/5044 715/728 |
| 2017/0264760 A1* | 9/2017 | Sato | .................... | H04N 1/00061 |
| 2017/0371537 A1* | 12/2017 | Sato | .................... | G06F 3/04886 |
| 2019/0080572 A1* | 3/2019 | Kim | ....................... | G06F 3/0482 |
| 2019/0099672 A1* | 4/2019 | Oyama | ................... | G06F 9/451 |

FOREIGN PATENT DOCUMENTS

JP    2015-032224    *    2/2015    ............. G06F 3/121

* cited by examiner

*Primary Examiner* — Beniyam Menberu
(74) *Attorney, Agent, or Firm* — Rowan TELS LLC (57) ABSTRACT

A remote frame buffer server configured to send a table of command IDs and command text labels to a remote frame buffer client. This table allows an operator to use text-based interactions in addition to pixel-based interactions to remotely manipulate a display managed by the remote frame buffer server.

20 Claims, 11 Drawing Sheets

EXTENSION OF REMOTE FRAME BUFFER (RFB) PROTOCOL

BACKGROUND

Remote frame buffer (RFB) is a protocol that allows an operator to interact with a computer display device that is in a geographic location remote from the operator. RFB is a pixel-based protocol. This means that the operator interacts with a remote screen, displayed by a local client application that emulates the target computer display. When the operator clicks on a pixel coordinate on the remote screen, the client application sends a PointerEvent with the XY coordinates of the cursor to an RFB server.

The RFB server processes this information, translating the pixel coordinate data into a corresponding interaction with the computer display, and sending the event to the computer display's display processor. This invokes the desired behavior, and changes to the computer display that result from this interaction are passed back to the RFB client, so that the operator can view the results in real time.

Reliance on this pixel-based command communication limits the operator's ability to interact with the remote device to mouse clicks. This limitation also requires the operator to wait for the client to update before another command may be processed. There is a need for operators to have additional options for RFB client interaction to improve usability of RFB client applications and to allow operators to send a series of commands with reduced latency.

BRIEF SUMMARY

This disclosure relates to a system and method that comprise a remote frame buffer server and a remote frame buffer client. The remote frame buffer server is configured to communicate a table of command IDs and command text labels to the remote frame buffer client in response to a screen change. The remote frame buffer client may then send a command ID from the table back to the remote frame buffer server, and this may simulate a selection event at the coordinate corresponding to the command ID.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

This disclosure relates to a system that comprises a remote frame buffer server and a remote frame buffer client. The remote frame buffer server may be configured to communicate a table of command IDs and command text labels to the remote frame buffer client in response to a screen change. The remote frame buffer client may then send a command ID from the table back to the remote frame buffer server, and this may simulate a selection event at the screen coordinate corresponding to the command ID.

The remote frame buffer server may be configured with a file comprising a number of tables. The tables may correlate command IDs, text labels, and coordinates for a particular screen ID. The coordinates for the screen ID may be pixel coordinates.

Figure 1:
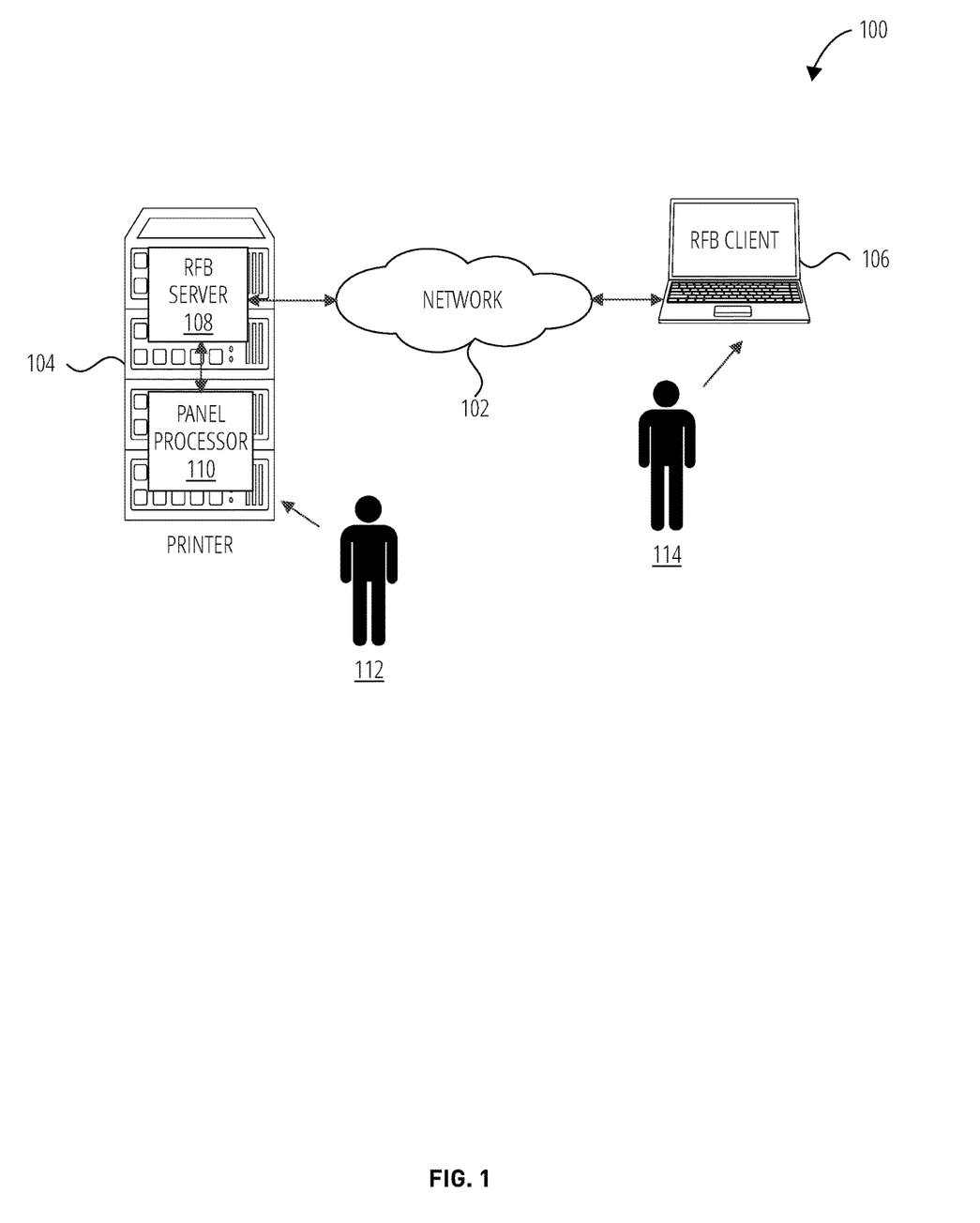
FIG. 1 illustrates a simplified system 100 in which a printer 104 and a remote frame buffer client 106 are communicatively coupled via a computer network 102.

The system disclosed herein may also include a panel processor. The panel processor may communicate a screen ID to the remote frame buffer server in response to a screen change on a display device, as a result of a selection event. The selection event may be a touch screen click or a mouse click provided to the panel processor. The click may be applied directly to the display device or may be sent from the remote frame buffer server based on signals from the remote frame buffer client. FIG. 1 provides an illustration of one embodiment of this system.

The remote frame buffer (RFB) server and client may communicate over a network using RFB protocol, as shown in FIG. 1. The RFB client may display a remote screen based on a display associated with the RFB server. When a user clicks on the remote screen, the RFB client may send a PointerEvent with the XY coordinates of the user's cursor. The RFB server may process these coordinates and pass the event to a processor controlling a display screen.

This disclosure relates to a system by which a remote operator may simulate clicking on buttons or icons of a display screen by speaking or typing a command, without dragging a pointer over a screen and clicking a mouse. Such a feature may be more convenient, provide a faster experience, and allow for serial command execution or automation through the construction of simple executable programs. Such command input may also allow for command logging to be performed and may provide better diagnostic capabilities.

In one embodiment, a remote panel window may contain a list of available commands along the left side, with a text input field in which the command may be typed, a drag and drop list, or a selectable list allowing an operator to accept a text-based command. A microphone and voice recognition functionality may be incorporated into the RFB client, allowing the user to execute a command by speaking it.

Figure 9:
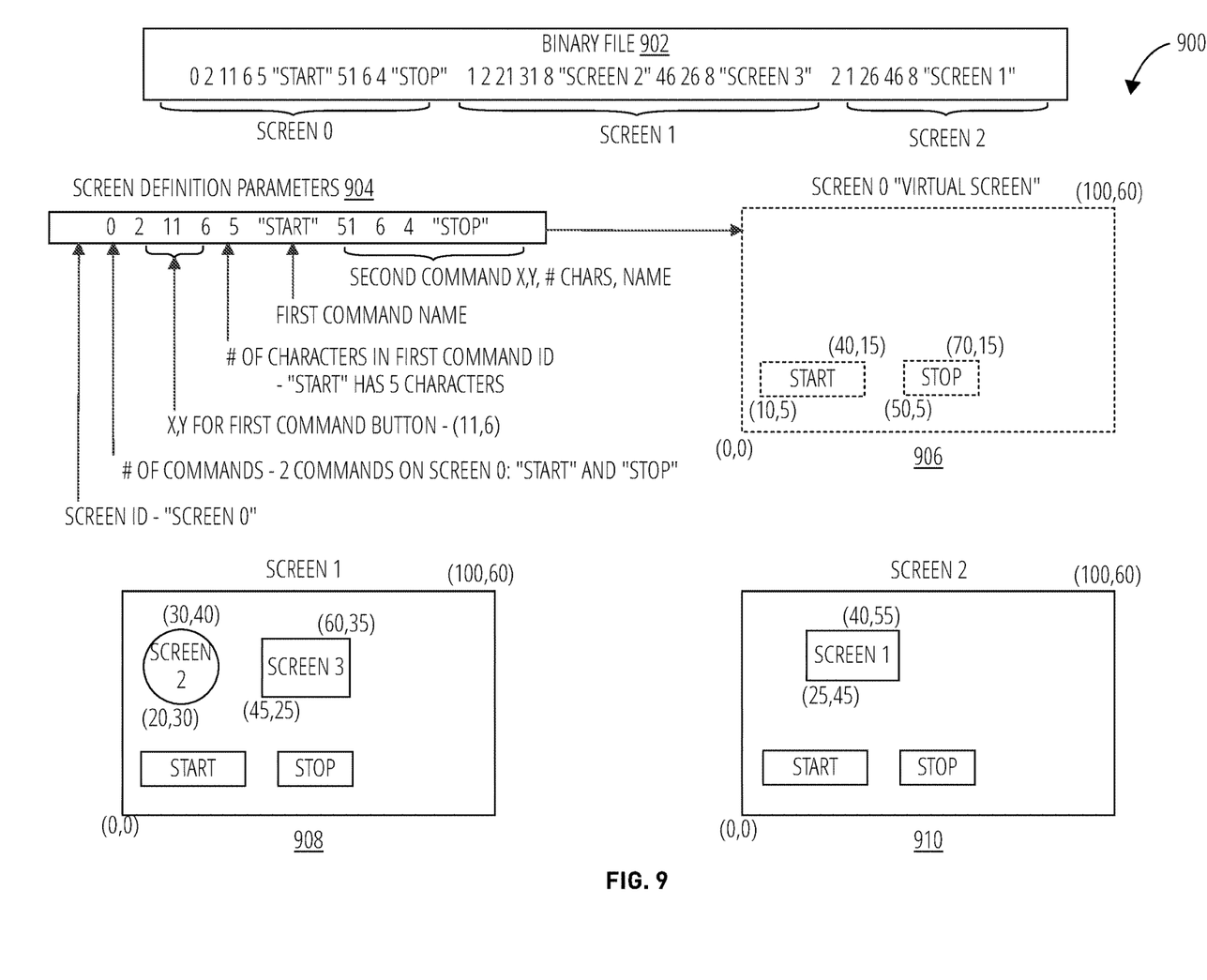
FIG. 9 illustrates screens and commands binary file 900 in accordance with one embodiment.

RFB is a flexible protocol; a user may easily create new pseudo encoding and implement it into the existing protocol. In one embodiment, the pseudo encoding system may comprise a set of commands with which the client and server may interact with a binary file containing parameters defining all of the existing screen variations and commands programmed into a particular system, that system being accessed by a remote operator. The binary file may represent the screens and commands as illustrated in FIG. 9.

The RFB server may fetch a binary file into its internal data structure during startup. The RFB server may give each command a unique command ID. The data structure may have a set of Screen IDs representing the screens available to a display panel. Each screen ID may have a set of Commands supported on that screen, and each command may be represented by a command ID and a name. A panel processor may have information about the Screen IDs and know the screen ID of the screen currently displayed on the display panel. The panel processor may notify the RFB server of the current screen ID every time the screen is updated.

Figure 5:
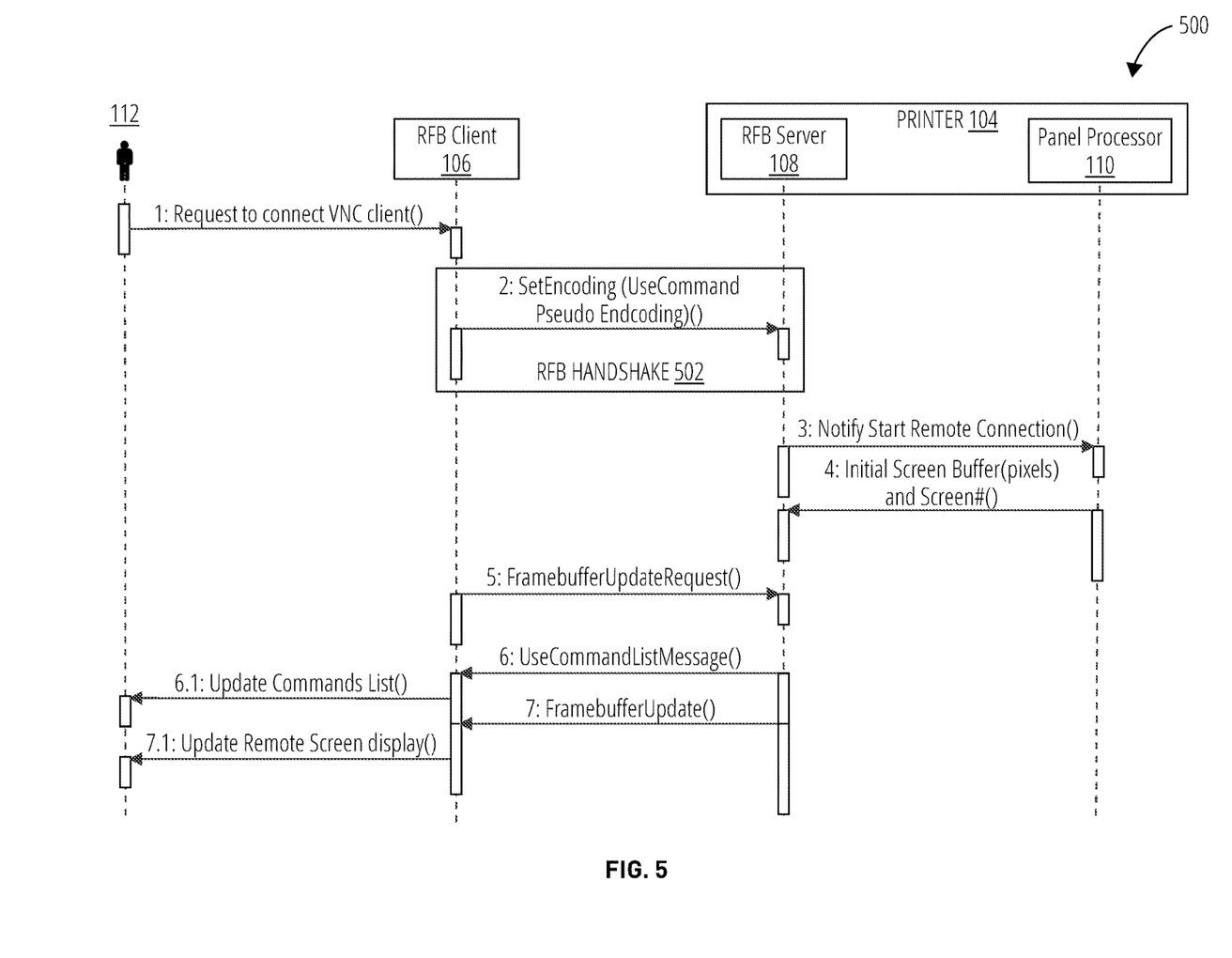
FIG. 5 illustrates an initial RFB interaction sequence diagram 500 in accordance with one embodiment.

The RFB client may open a remote session by notifying the RFB server that it supports the appropriate pseudo encoding, using the standard RFB message "SetEncoding" (see FIG. 5). The RFB server responds by sending a "UseCommandList" message. The RFB server may create this message based on information from previous screens and the current screen ID. The screen ID may be shared with the client in some embodiments. The RFB client may display an emulation of the screen currently on the display panel as well as the text-based command interface disclosed herein. The operator may select a command, and the RFB client may send a "UseCommand" message to the server with the unique command ID.

The RFB server may receive the "UseCommand" message with the command ID, and may look up the corresponding X,Y coordinates for that command ID within the internal data structure. The RFB server may simulate clicking that X,Y pixel event and send the simulated event to the panel processor. The panel processor may then execute the command and manage the display panel screen update. Using the binary file with specific formatting makes the system disclosed herein flexible and scalable, as only the binary file may need to be updated to implement the system using a new device or product.

FIG. 1 illustrates a system 100 in which a printer 104 and a remote frame buffer client 106 are connected to a computer network 102. The printer 104 includes a remote frame buffer server 108 and a panel processor 110. The panel processor 110 manages a display that allows a human operator 112 to interact with the printer 104. The remote frame buffer server 108 allows a human operator 114 to interact with the printer 104 remotely by means of the remote frame buffer client 106 using RFB protocol.

In various embodiments, the computer network 102 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the computer network 102 may also include a voice network that conveys not only voice communications, but also non-voice data such as Short Message Service ("SMS") messages, as well as data communicated via various cellular data communication protocols, and the like.

In various embodiments, the remote frame buffer client 106 may include desktop PCs, mobile phones, laptops, tablets, wearable computers, or other computing devices that are capable of connecting to the computer network 102 and communicating with the printer 104, such as described herein.

In various embodiments, additional infrastructure (e.g., short message service centers, cell sites, routers, gateways, firewalls, and the like), as well as additional devices may be present. Further, in some embodiments, the functions described as being provided by some or all of the printer 104 and the remote frame buffer client 106 may be implemented via various combinations of physical and/or logical devices. However, it is not necessary to show such infrastructure and implementation details in FIG. 1 in order to describe an illustrative embodiment.

Figure 2:
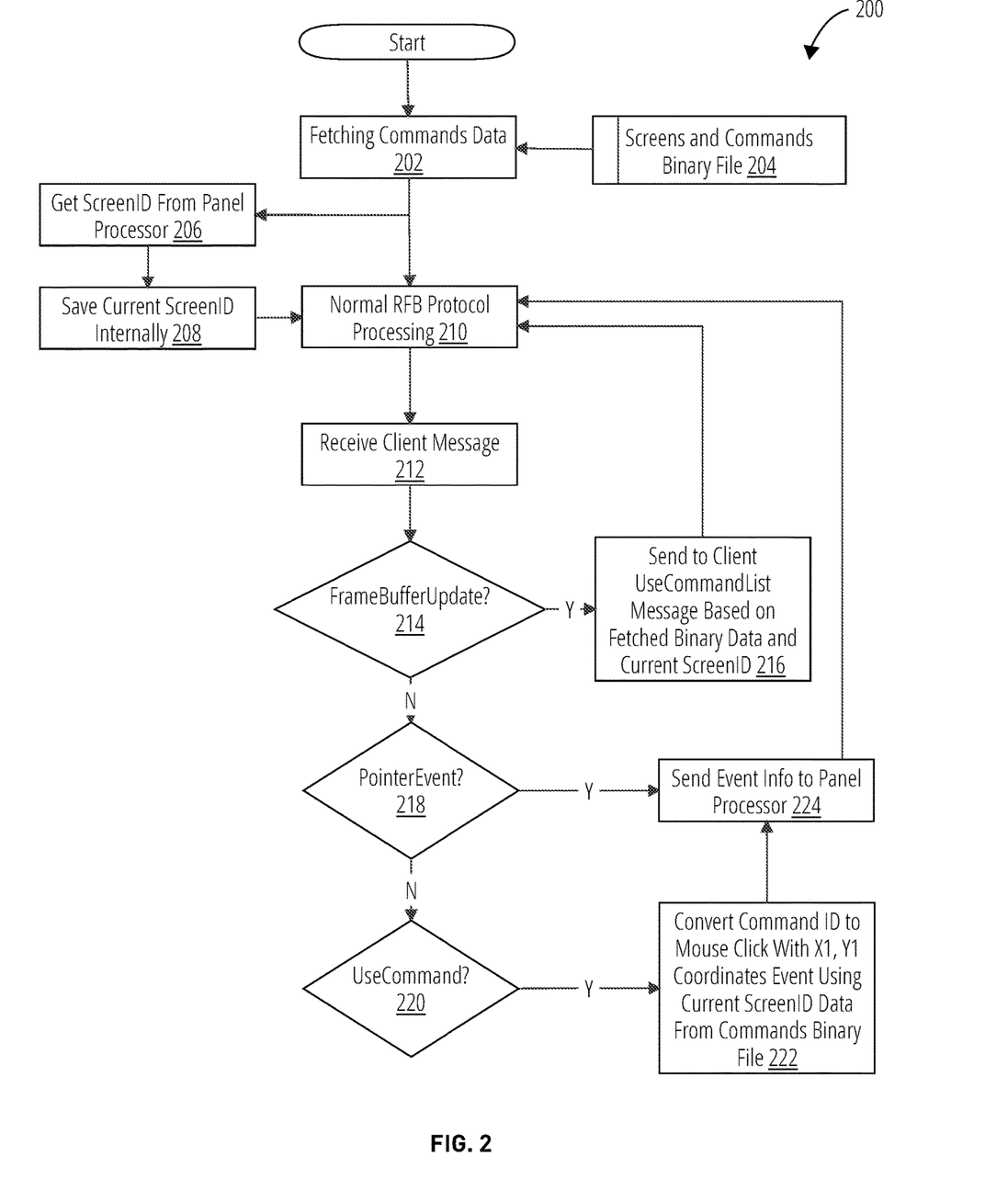
FIG. 2 illustrates an RFB communication method 200 in accordance with one embodiment.

FIG. 2 illustrates an RFB communication method 200 in accordance with one embodiment. The RFB client begins by fetching the commands data from the RFB server (block 202). The RFB server provides the binary file containing this information (block 204). The RFB server gets the ScreenID from the panel processor and saves it internally (block 206 and block 208). Normal RFB processing may continue (block 210), as described in further detail in FIG. 6). The RFB server may receive the client message (block 212).

If a FrameBufferUpdate is received (decision block 214), the server may send the client the UseCommandList message (block 216). If a Pointer Event is received (decision block 218), the event info is sent to the panel processor (block 224). If a UseCommand message is sent (decision block 220), the server converts the command ID to mouse click coordinates (block 222), sends the event to the panel processor (block 224). Each of these events is processed using the normal RFB protocol.

Figure 3:
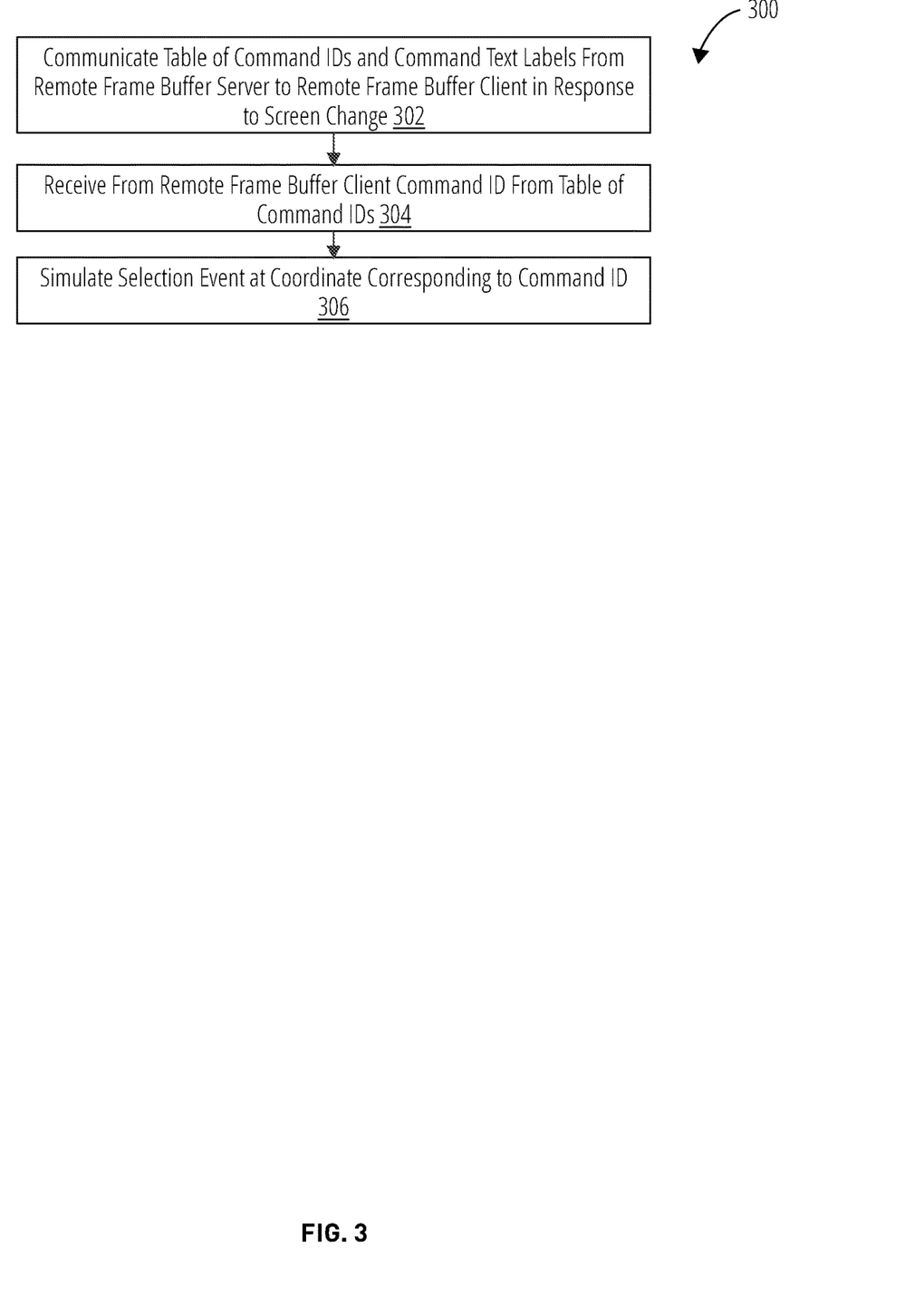
FIG. 3 illustrates an RFB communication method 300 in accordance with one embodiment.

Referring to FIG. 3, a method 300 in accordance with an embodiment, communicates a table of command IDs and command text labels from a remote frame buffer server to a remote frame buffer client in response to a screen change (block 302). In block 304, the method 300 receives from the remote frame buffer client a command ID from the table of command IDs. Finally, the method 300 simulates a selection event at a coordinate corresponding to the command ID (block 306).

Figure 4:
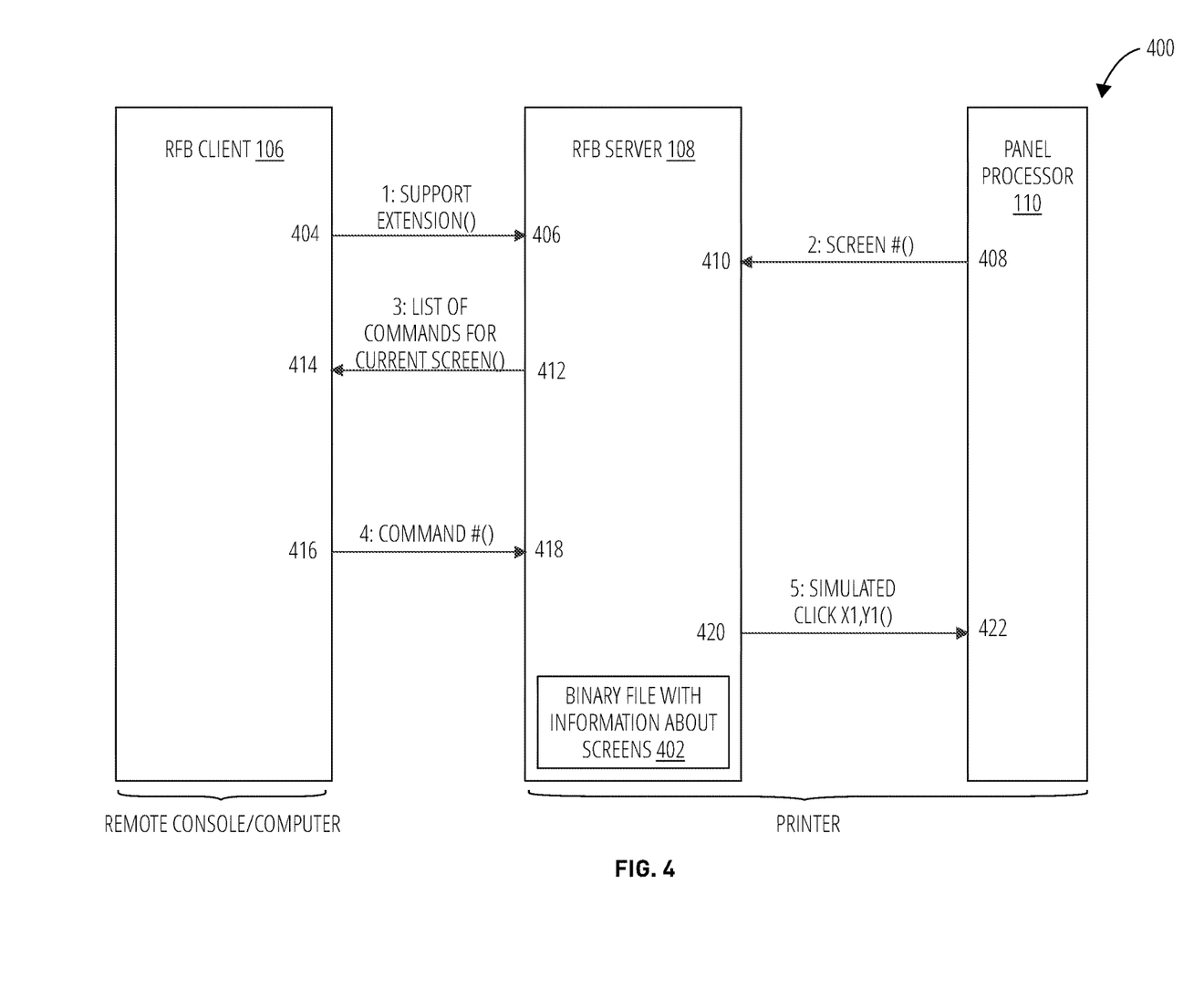
FIG. 4 illustrates a communication diagram 400 in accordance with one embodiment.

FIG. 4 illustrates a communication diagram 400 in accordance with one embodiment. A remote frame buffer client 106 may be installed on a remote console or computer, in communication with a printer. The printer may include a remote frame buffer server 108 and a panel processor 110. The remote frame buffer server 108 may store a binary file with information about screens 402.

Pseudo encoding commands are shown that may facilitate the actions described below. The client initiates a handshake 404, and the server accepts the handshake 406. The panel processor notifies the server of its current screen 408, and the server loads the screen information file 410. The server sends a command list to the client 412, and the client presents a list of commands to the user 414. The client sends the ID of the user-selected command to the server 416, and the server looks up coordinates for the command ID 418. the server sends the coordinates of a simulated cursor event to the panel processor 420, and the panel processor updates its screen based on the selected command ID 422. This process is shown in more detail in FIG. 5, FIG. 6, and FIG. 7.

FIG. 5 illustrates an initial RFB interaction sequence diagram 500. The initial interactions are shown that comprise the method described herein. A human operator 112 may request to connect with the printer 104 using the remote frame buffer client 106. The remote frame buffer client 106 may send an RFB handshake 502 signal to the remote frame buffer server 108 onboard the printer 104 as shown to confirm that the remote frame buffer server 108 supports the expanded RFB protocol disclosed herein. (If the remote frame buffer server 108 does not support the expanded RFB protocol, the client may continue to communicate with the remote frame buffer server 108 using a standard RFB click-based protocol.)

The remote frame buffer server 108 may notify the panel processor 110 that a remote connection has been made, and the panel processor 110 may return information on the screen it is currently displaying. The remote frame buffer client 106 may request a frame buffer update of the remote frame buffer server 108. The remote frame buffer server 108 may respond using the expanded RFB protocol to provide a list of commands available, based on the current screen and the corresponding information in the binary file. The remote frame buffer server 108 may also provide the frame buffer update requested. By this means, the remote frame buffer client 106 may update the commands list and remote screen presented to the human operator 112.

Figure 6:
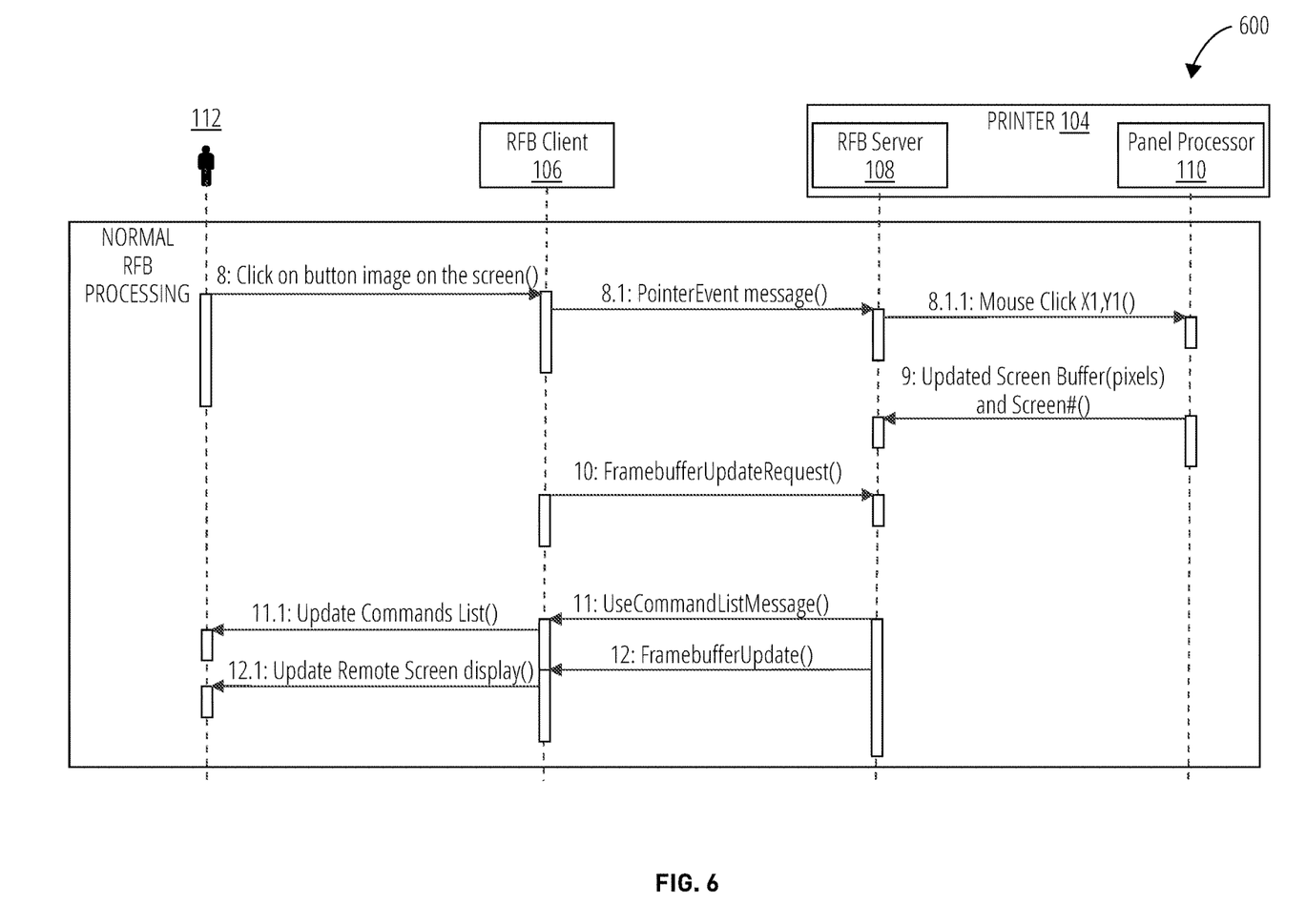
FIG. 6 illustrates an initial RFB interaction sequence diagram 500 in accordance with one embodiment.

FIG. 6 illustrates a standard RFB interaction sequence diagram 600. In the case that the expanded RFB protocol disclosed herein is not supported, or when the user input may be communicated over standard RFB, the remote commands from a human operator 112, made via a remote frame buffer client 106, to a remote frame buffer server 108 that in turn communicates with a panel processor 110, may be handled as shown.

Under normal RFB processing, the human operator 112 may click on a button or other option within the screen image displayed on the remote frame buffer client 106. The remote frame buffer client 106 may send a corresponding pointer event message to the remote frame buffer server 108. The remote frame buffer server 108 may convert the pointer event to the X,Y coordinates of a simulated mouse click and send this simulated click information to the panel processor 110.

The panel processor 110 may update the printer 104 local display and send the screen buffer and number for the new screen back to the remote frame buffer server 108. The remote frame buffer client 106 may request a frame buffer update of the remote frame buffer server 108, and the remote frame buffer server 108 may send the update as requested.

Figure 7:
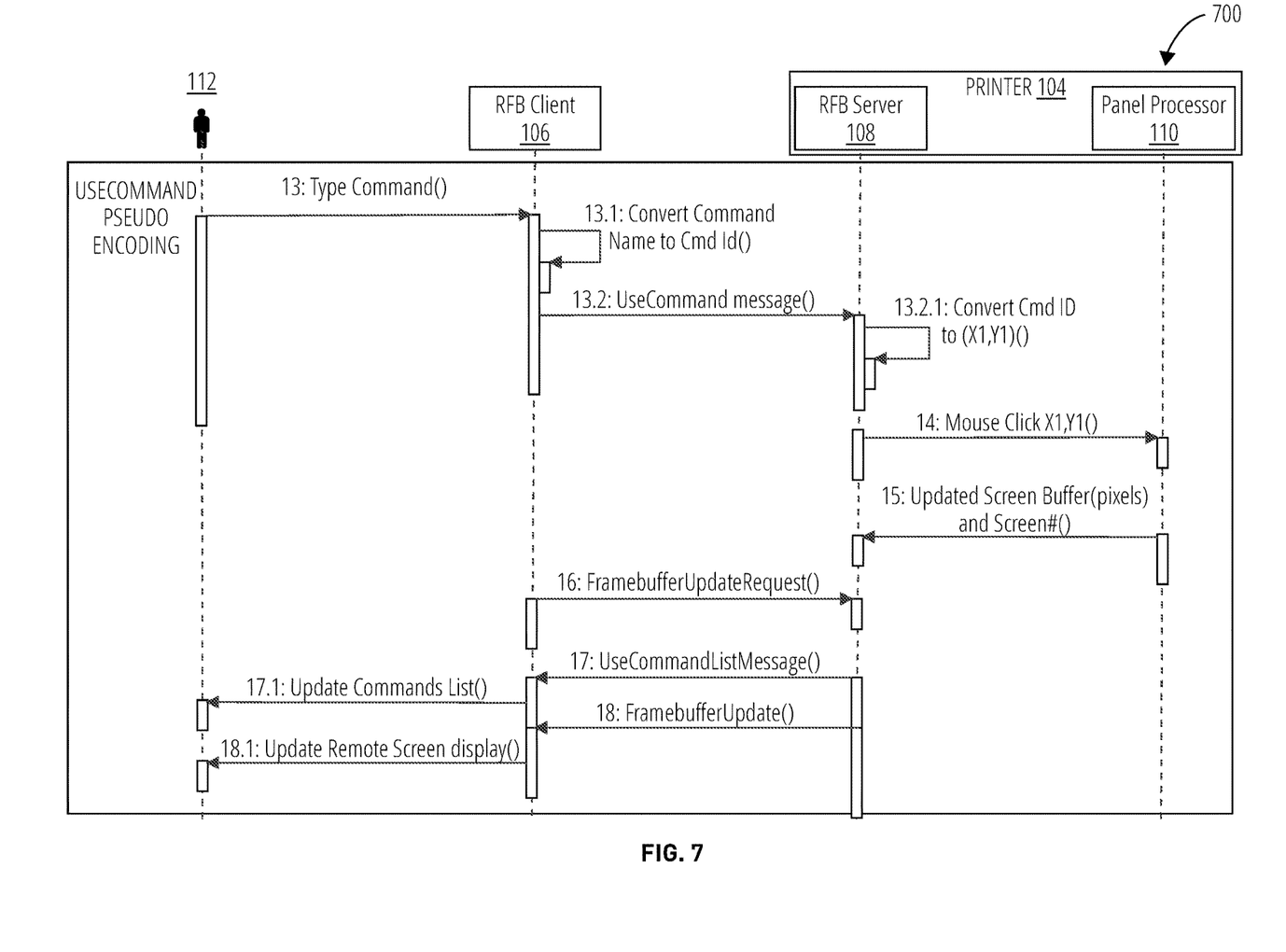
FIG. 7 illustrates an initial RFB interaction sequence diagram 500 in accordance with one embodiment.

FIG. 7 illustrates an expanded RFB interaction sequence diagram 700. When the expanded RFB protocol disclosed herein is supported, instead of clicking on the screen image displayed by the remote frame buffer client 106, the human operator 112 may type or otherwise select a text-based option corresponding to an available command. The remote frame buffer client 106 may convert the typed or selected text-based option to a command ID. The expanded RFB protocol may be used to send that command ID to the remote frame buffer server 108.

The remote frame buffer server 108 may use the binary file it stores to convert the command ID to X,Y coordinates corresponding to a simulated mouse click. These coordinates may be sent to the panel processor 110, and the panel processor 110 may update its screen and send new screen information, just as is shown in FIG. 6. The remote frame buffer client 106 may request a frame buffer update, and the remote frame buffer server 108 may provide that update, just as in the previous illustrations.

Figure 8:
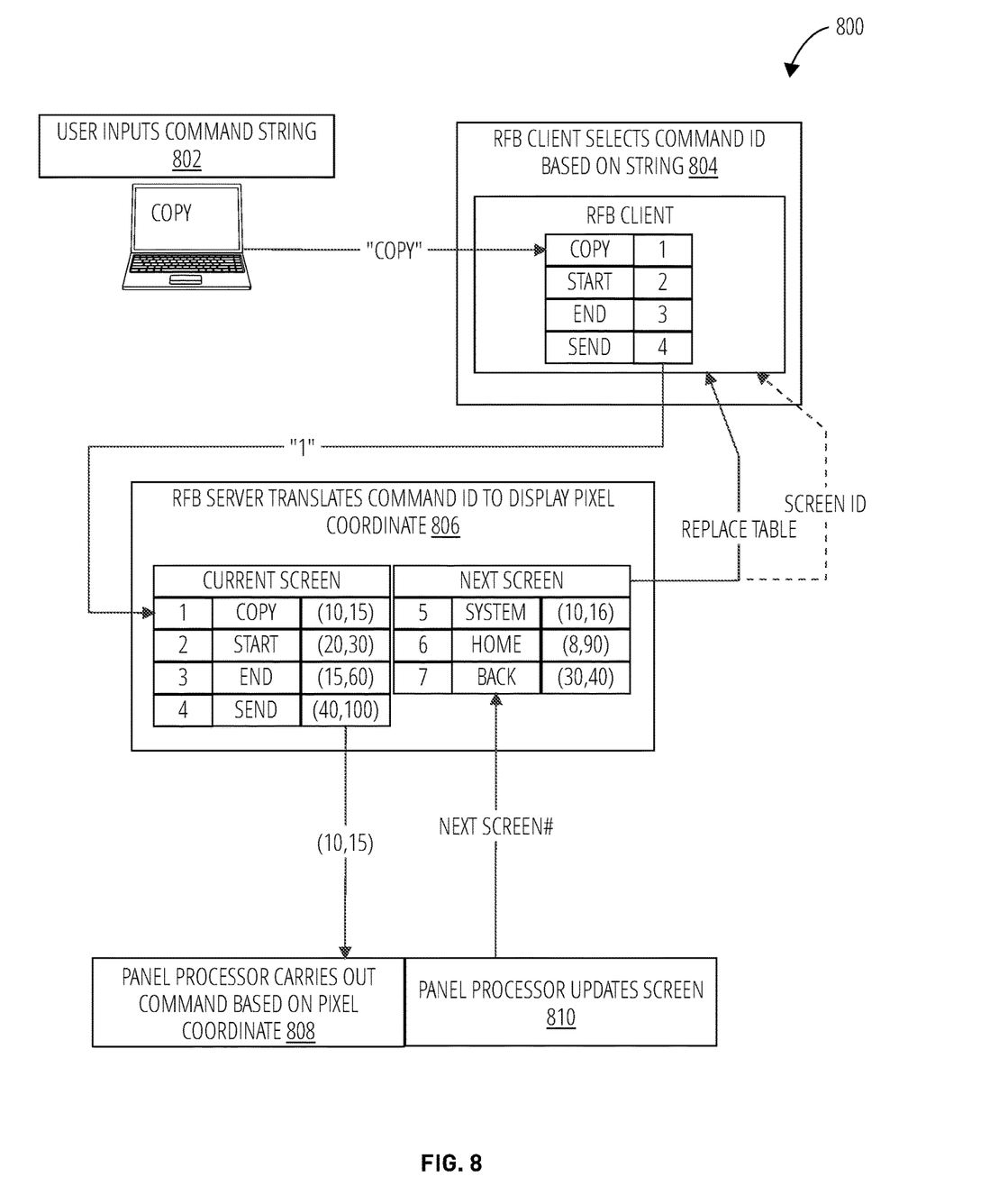
FIG. 8 illustrates an expanded RFB process example 800 in accordance with one embodiment.

FIG. 8 illustrates an expanded RFB process example 800 in accordance with one embodiment. The RFB client may present a user with a command list including the option to select or type "copy" command. This diagram illustrates how that command is processed through the expanded RFB protocol.

When the user wishes to instruct the remote printer to execute the copy command, the user may input the command string "copy" at the RFB client (block 802). The "copy" command string may then be processed by the RFB client based on a command list previously provided by the RFB server. The "copy" command string may thus be converted to the command ID "1" (block 804). The RFB client may send the command ID "1" to the RFB server.

The RFB server may store a binary file containing definitions for all of the screens the printer may use. This binary file is illustrated in more detail in FIG. 9. As can be seen in FIG. 8, the command ID "1", associated with the "copy" command, may correspond to a mouse click event at the coordinates (10,15). The RFB server may use the binary file to determine this (block 806), and may then transmit the coordinates (10,15) as a simulated mouse click to the panel processor.

The panel processor may accept the simulated mouse click at (10,15) and may execute the "copy" command based on those coordinates (block 808). The panel processor may as a result also update the display panel to a next screen (block 810). This next screen number may be communicated back to the RFB server. A new set of commands may be associated with this next screen. The RFB server may communicate a new command list or table to the RFB client. In some embodiments, a screen ID may also be communicated. The RFB client may present the new options to the user, and the user may input a command to be executed via the next screen, beginning the process again.

FIG. 9 illustrates a screens and commands binary file 900 in accordance with one embodiment. The binary file 902 may comprise a string of binary characters that define the parameters of numerous screens. These characters are shown as decimal numbers and text in this example for ease of readability. The screen definition parameters 904 are defined in detail for a Screen 0 (virtual screen) 906. This virtual screen may not be an actual screen displayed on the panel, but may instead be used to collect a set of commands that may be used on every screen, such as "Start" and "Stop" in this example, so that these definitions may be set once, and do not need to be repeated throughout the binary file 902.

Each screen definition may begin with a unique screen identifier (screen ID), in this case, "0". After the screen ID, the number of commands that can be accessed from the screen may be listed. In the Screen 0 case, this number is "2" (i.e., "Start" and "Stop"). The next set of characters may provide the X and Y coordinates associated with the first command (i.e., "Start"). As is shown in the depiction of Screen 0 (virtual screen) 906, the Start "button" spans a range from 10,5 in the lower left to 40,15 at the upper right. Thus, the coordinates shown, "11" and "6," correspond to a point within the boundaries of that button, and thus may be used to effect the "Start" command. The parameter after the coordinates may indicate the number of characters contained in the first command name, i.e., the word "Start." The next parameter may define the characters in the name.

After the parameters for the first command have been fully listed, the parameters for the second command may follow. Third and fourth commands may be listed after that, with as many commands listed as are identified in the earlier field. Once all of the commands for Screen 0 (virtual screen) 906 have been defined, the binary file 902 may continue with the parameters for Screen 1 908 and Screen 2 910 as shown.

Figure 10:
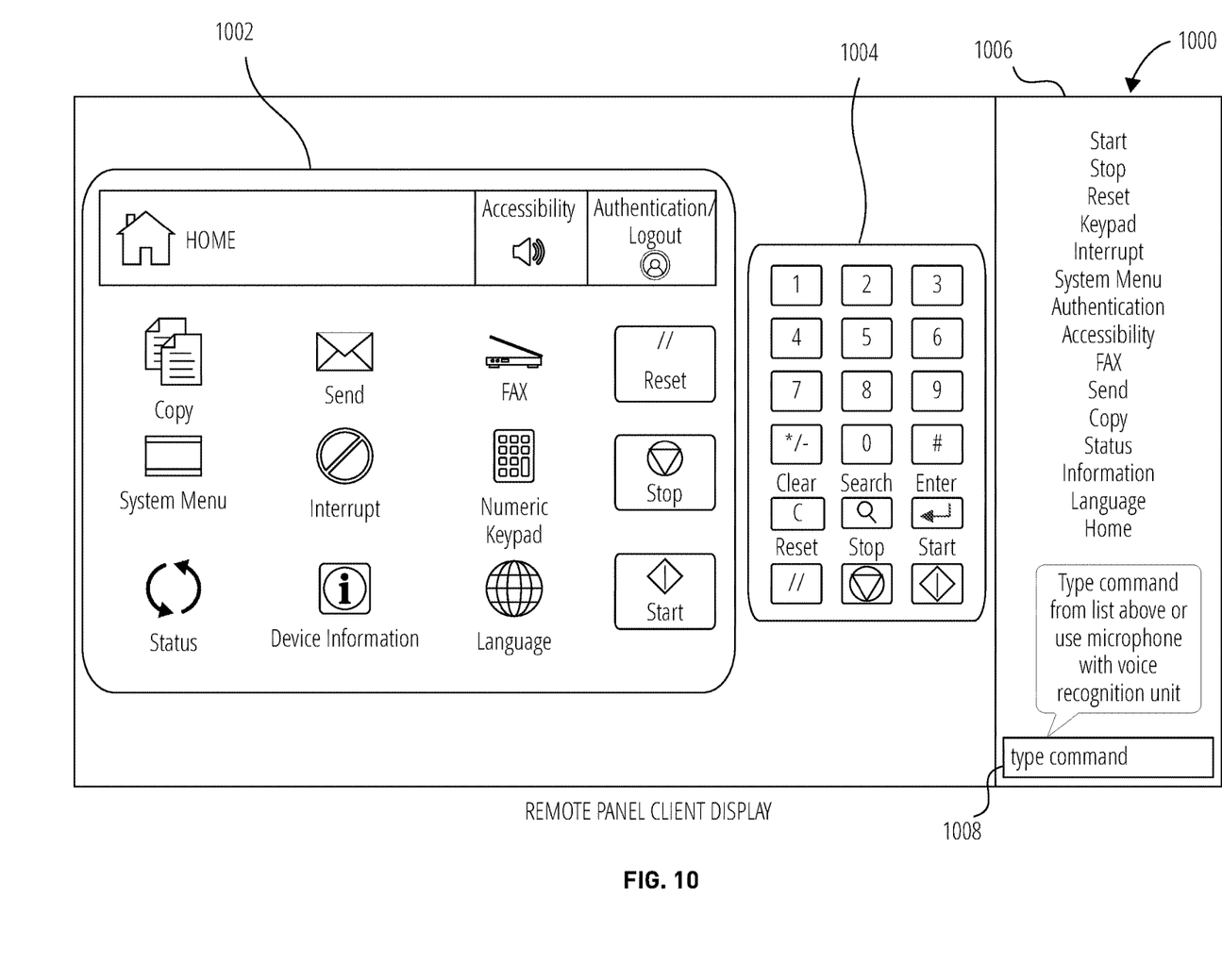
FIG. 10 illustrates a remote panel client display 1000 in accordance with one embodiment.

FIG. 10 illustrates a remote panel client display 1000 in accordance with one embodiment. The RFB client connected to a printer might display an application screen comprising a virtual printer display 1002, a virtual numeric keyboard 1004, a list of possible commands 1006, and an input text field 1008, as shown.

The virtual printer display 1002 shown on the remote panel client display 1000 may be an accurate remote representation of what would be shown on the display screen located on the printer, corresponding to the current screen ID. A virtual representation of the numeric key panel located on the printer may also be displayed, as shown by virtual numeric keyboard 1004.

The remote panel client display 1000 may include a list of possible commands 1006 associated with the current screen ID. The commands may include, but are not limited to, one or more of Start, Stop, Reset, Keypad, Interrupt, System menu, Authentication, Accessibility, FAX, Send, Copy status, Information, Language, and Home.

An input text field 1008 may be provided to allow a user to type in one of the possible commands. Alternately, other means of selecting from the list of commands may include clicking, dragging and dropping, or otherwise selecting a command from the list, or speaking the command aloud to select it by means of a microphone and voice recognition functionality.

Figure 11:
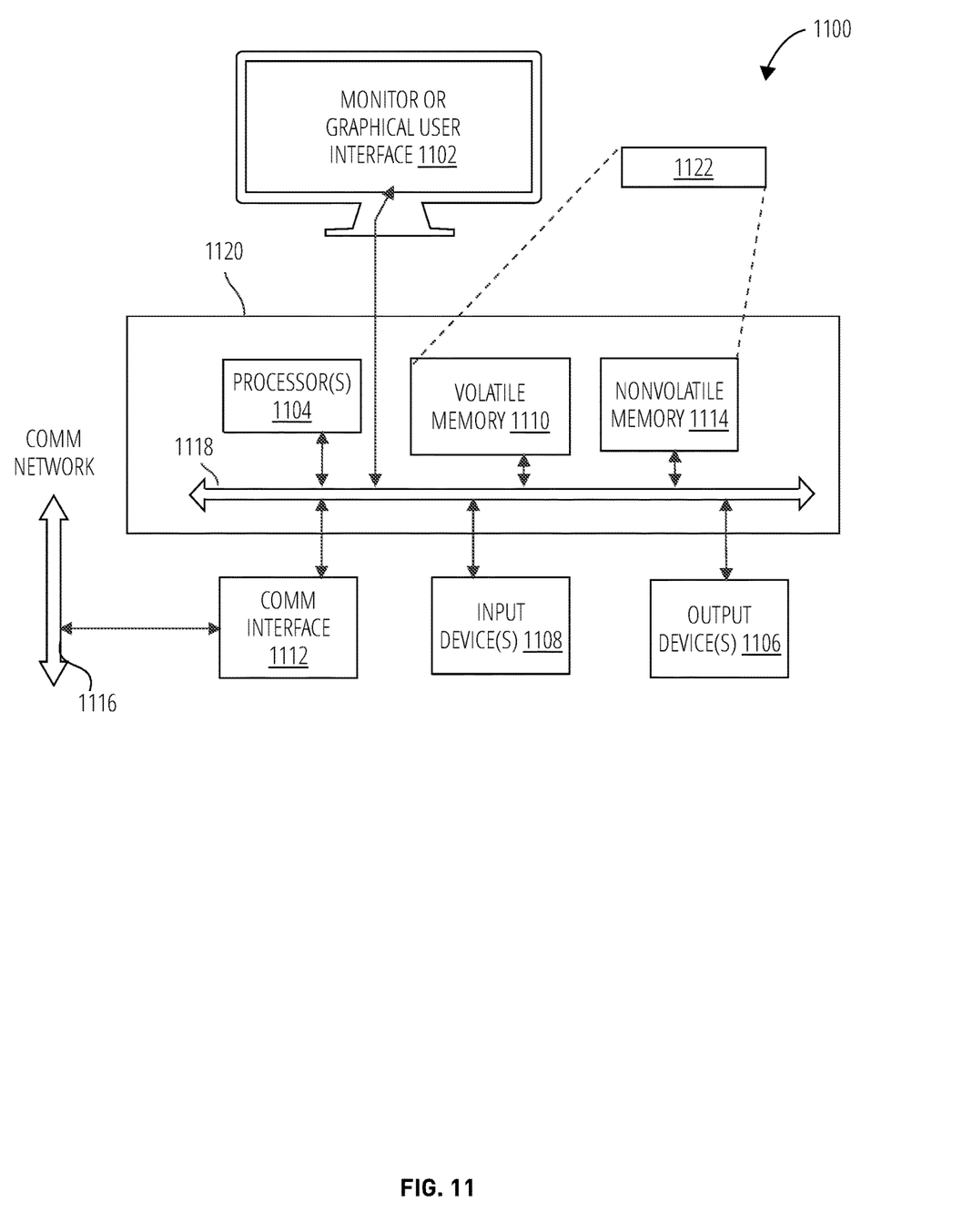
FIG. 11 is an example block diagram of a computing device 1100 that may incorporate embodiments of the present disclosure.

FIG. 11 is an example block diagram of a computing device 1100 that may incorporate embodiments of the present invention. FIG. 11 is merely illustrative of a machine system to carry out aspects of the technical processes described herein and does not limit the scope of the claims. One of ordinary skill in the art would recognize other variations, modifications, and alternatives. In one embodiment, the computing device 1100 typically includes a monitor or graphical user interface 1102, a data processing system 1120, a communication network interface 1112, input device(s) 1108, output device(s) 1106, and the like.

As depicted in FIG. 11, the data processing system 1120 may include one or more processor(s) 1104 that communicate with a number of peripheral devices via a bus subsystem 1118. These peripheral devices may include input device(s) 1108, output device(s) 1106, communication network interface 1112, and a storage subsystem, such as a volatile memory 1110 and a nonvolatile memory 1114.

The volatile memory 1110 and/or the nonvolatile memory 1114 may store computer-executable instructions and thus forming logic 1122 that when applied to and executed by the processor(s) 1104 implement embodiments of the processes disclosed herein.

The input device(s) 1108 include devices and mechanisms for inputting information to the data processing system 1120. These may include a keyboard, a keypad, a touch screen incorporated into the monitor or graphical user interface 1102, audio input devices such as voice recognition systems, microphones, and other types of input devices. In various embodiments, the input device(s) 1108 may be embodied as a computer mouse, a trackball, a track pad, a joystick, wireless remote, drawing tablet, voice command system, eye tracking system, and the like. The input device(s) 1108 typically allow a user to select objects, icons, control areas, text and the like that appear on the monitor or graphical user interface 1102 via a command such as a click of a button or the like.

The output device(s) 1106 include devices and mechanisms for outputting information from the data processing system 1120. These may include the monitor or graphical user interface 1102, speakers, printers, infrared LEDs, and so on as well understood in the art.

The communication network interface 1112 provides an interface to communication networks (e.g., communication network 1116) and devices external to the data processing system 1120. The communication network interface 1112 may serve as an interface for receiving data from and transmitting data to other systems. Embodiments of the communication network interface 1112 may include an Ethernet interface, a modem (telephone, satellite, cable, ISDN), (asynchronous) digital subscriber line (DSL), Fire-Wire, USB, a wireless communication interface such as Bluetooth or WiFi, a near field communication wireless interface, a cellular interface, and the like.

The communication network interface 1112 may be coupled to the communication network 1116 via an antenna, a cable, or the like. In some embodiments, the communication network interface 1112 may be physically integrated on a circuit board of the data processing system 1120, or in some cases may be implemented in software or firmware, such as "soft modems", or the like.

The computing device 1100 may include logic that enables communications over a network using protocols such as HTTP, TCP/IP, RTP/RTSP, IPX, UDP and the like.

The volatile memory 1110 and the nonvolatile memory 1114 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1110 and the nonvolatile memory 1114 may be configured to store the basic programming and data constructs that provide the functionality of the disclosed processes and other embodiments thereof that fall within the scope of the present invention.

Logic 1122 that implements embodiments of the present invention may be stored in the volatile memory 1110 and/or the nonvolatile memory 1114. Said logic 1122 may be read from the volatile memory 1110 and/or nonvolatile memory 1114 and executed by the processor(s) 1104. The volatile memory 1110 and the nonvolatile memory 1114 may also provide a repository for storing data used by the logic 1122.

The volatile memory 1110 and the nonvolatile memory 1114 may include a number of memories including a main random access memory (RAM) for storage of instructions and data during program execution and a read only memory (ROM) in which read-only non-transitory instructions are stored. The volatile memory 1110 and the nonvolatile memory 1114 may include a file storage subsystem providing persistent (non-volatile) storage for program and data files. The volatile memory 1110 and the nonvolatile memory 1114 may include removable storage systems, such as removable flash memory.

The bus subsystem 1118 provides a mechanism for enabling the various components and subsystems of data processing system 1120 communicate with each other as intended. Although the communication network interface 1112 is depicted schematically as a single bus, some embodiments of the bus subsystem 1118 may utilize multiple distinct busses.

It will be readily apparent to one of ordinary skill in the art that the computing device 1100 may be a device such as a smartphone, a desktop computer, a laptop computer, a rack-mounted computer system, a computer server, or a tablet computer device. As commonly known in the art, the computing device 1100 may be implemented as a collection of multiple networked computing devices. Further, the computing device 1100 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The methods and system in this disclosure are described in the preceding on the basis of several preferred embodiments. Different aspects of different variants are considered to be described in combination with each other such that all combinations, upon reading by a skilled person in the field on the basis of this document, may be regarded as being read within the concept of the disclosure. The preferred embodiments do not limit the extent of protection of this document.

Having thus described embodiments of the present disclosure of the present application in detail and by reference to illustrative embodiments thereof, it will be apparent that modifications and variations are possible without departing from the scope of the present disclosure.

What is claimed is:

1. A system comprising:
   a remote frame buffer server;
   a remote frame buffer client, wherein the remote frame buffer client comprises a control panel for a printer;
   the remote frame buffer server configured to:
      communicate a table of command IDs and command text labels to the remote frame buffer client in response to a screen change;
      receive from the remote frame buffer client a command ID from the table of command IDs; and
      simulate a selection event at a coordinate corresponding to the command ID; and
   the remote frame buffer client configured to:
      receive the table of command IDs and the command text labels from the remote frame buffer server;
      display a remote panel window on a display module of the remote frame buffer client, the remote panel window including a list of available commands in addition to a displayed image of the control panel for the printer, wherein the list of the available commands corresponds to the table of command IDs received from the remote frame buffer server;
      receive a selection from the list of the available commands as a selected command, the selected command having a corresponding command ID from the table of command IDs; and
      send the corresponding command ID of the selected command to the remote frame buffer server.

2. The system of claim 1, the remote frame buffer server configured with a file comprising a plurality of tables, each of the tables correlating the command IDs, the command text labels, and the coordinates for a particular screen ID.

3. The system of claim 2, wherein the file includes a binary file representing the command IDs, the command text labels, the coordinates, and the screen ID in a string of binary character format, and the remote frame buffer server is configured to parse the binary file and to determine a command to be performed.

4. The system of claim 3, wherein, when a second printer is newly installed in the system, the remote frame buffer server is configured to update the binary file.

5. The system of claim 1, wherein the coordinate is a pixel coordinate.

6. The system of claim 1, further comprising a panel processor.

7. The system of claim 6, the panel processor communicating a screen ID to the remote frame buffer server in response to the screen change.

8. The system of claim 6, wherein the selection event is a simulated mouse click provided to the panel processor.

9. The system of claim 1 wherein a user on the remote frame buffer client selects the command ID using the control panel for the printer.

10. The system of claim 1, wherein the command ID received from the remote frame buffer client is selected by a user on the remote frame buffer client, the user performing at least one action including a voice command, a text field entry, a drag and drop action from a draggable list, and a command selection from a selectable list.

11. The system of claim 1, wherein the command ID includes one or more of Start, Stop, Reset, Keypad, Interrupt, System menu, Authentication, Accessibility, FAX, Send, Copy status, Information, Language, and Home.

12. The system of claim 1, wherein the step of receiving a selection of the command ID among the command IDs of the list of the available commands performed by the remote buffer frame client includes:

displaying an input type field on the remote panel window;

receiving a text corresponding to the command IDs typed in the displayed input type field; and determining the corresponding command ID to the typed text.

13. A method comprising:

communicating a table of command IDs and command text labels from a remote frame buffer server to a remote frame buffer client in response to a screen change, wherein the remote frame buffer client comprises a control panel for a printer;

receiving from the remote frame buffer client a command ID from the table of command IDs;

displaying a remote panel window on a display module of the remote frame buffer client, the remote panel window including a list of available commands in addition to a displayed image of the control panel for the printer, wherein the list of the available commands corresponds to the table of command IDs received from the remote frame buffer server;

receiving a selection by a user on the remote frame buffer client, the selection made from the list of the available commands, the selection corresponding to a selected command ID from the table of command IDs; and simulating a selection event at a coordinate corresponding to the selected command ID.

14. The method of claim 13, further comprising configuring the remote frame buffer server with a file comprising a plurality of tables, each of the tables correlating the command IDs, the command text labels, and the coordinates for a particular screen ID.

15. The method of claim 13, wherein the coordinate is a pixel coordinate.

16. The method of claim 13, further comprising a panel processor communicating with the remote frame buffer server.

17. The method of claim 16, wherein the panel processor communicates a screen ID to the remote frame buffer server in response to the screen change.

18. The method of claim 16, wherein the selection event is a simulated mouse click provided to the panel processor.

19. The method of claim 13, further comprising the user on the remote frame buffer client selecting the command ID received from the remote frame buffer client, the user performing at least one action including a voice command, a text field entry, a drag and drop action from a list, and a command selection from a selectable list.

20. The method of claim 13, wherein the command ID includes one or more of Start, Stop, Reset, Keypad, Interrupt, System menu, Authentication, Accessibility, FAX, Send, Copy status, Information, Language, and Home.

* * * * *